(12) United States Patent
Kolton et al.

(10) Patent No.: US 7,363,783 B2
(45) Date of Patent: Apr. 29, 2008

(54) ROD AND REEL SUPPORT WITH ELECTRONIC MARKER DEVICE

(75) Inventors: Chester Kolton, Westfield, NJ (US); Michael Norman, East Brunswick, NJ (US); Robert Whittemore, Montgomery, NY (US)

(73) Assignee: B&G Plastics, Inc., Newark, NJ (US)

( * ) Notice: Subject to any disclaimer, the term of this patent is extended or adjusted under 35 U.S.C. 154(b) by 207 days.

(21) Appl. No.: 11/236,417

(22) Filed: Sep. 26, 2005

(65) Prior Publication Data

US 2007/0068202 A1    Mar. 29, 2007

(51) Int. Cl.
    *E05B 73/00*    (2006.01)
(52) U.S. Cl. ................. 70/57.1; 43/22; 43/25; 70/58; 70/63; 206/315.11; 211/70.8; 340/572.9
(58) Field of Classification Search ............ 70/57.1, 70/63, 58–61; 43/20, 22, 25; 211/70.8; 340/572.8, 572.9; 206/315.1, 315.11, 349, 206/579; 292/307 R, 307 B, 317–321

See application file for complete search history.

(56) References Cited

U.S. PATENT DOCUMENTS

| | | | | |
|---|---|---|---|---|
| 1,339,238 A * | 5/1920 | Tillman | ......................... | 43/22 |
| 2,149,087 A * | 2/1939 | Fisher | ............................ | 43/26 |
| 2,512,082 A * | 6/1950 | Bainbridge et al. | ........ | 411/416 |
| 4,133,133 A * | 1/1979 | Casset | ............................ | 43/22 |
| 4,136,478 A * | 1/1979 | Wycosky | ........................ | 43/26 |
| 4,237,640 A * | 12/1980 | Sato | ............................... | 43/22 |
| 4,359,161 A * | 11/1982 | Sinoff | ...................... | 206/315.11 |
| 4,493,416 A * | 1/1985 | Steinman | ............... | 206/315.11 |
| 4,726,139 A * | 2/1988 | Tokuda | ........................... | 43/22 |
| 4,795,197 A * | 1/1989 | Kaminski et al. | ............. | 285/12 |
| 4,850,130 A * | 7/1989 | Childre et al. | ................ | 43/23 |
| 4,946,034 A * | 8/1990 | Matsubara | ............. | 206/315.11 |
| 5,218,776 A * | 6/1993 | Wolf et al. | ..................... | 43/25 |
| 5,222,319 A * | 6/1993 | Yamato | .......................... | 43/22 |
| 5,347,742 A * | 9/1994 | Ohmura | ......................... | 43/22 |
| 5,361,611 A * | 11/1994 | Hisler | ........................... | 70/18 |
| 5,385,373 A * | 1/1995 | Love | ...................... | 292/307 B |
| 5,873,144 A * | 2/1999 | Tupper et al. | ........... | 16/18 CG |
| 6,067,740 A * | 5/2000 | Alley | ............................ | 43/22 |
| 6,151,826 A * | 11/2000 | Grice | ............................ | 43/22 |
| 6,317,046 B1 * | 11/2001 | Fresnel et al. | ........... | 340/572.9 |
| 6,374,534 B1 * | 4/2002 | Takizawa | ....................... | 43/22 |
| 6,433,686 B1 * | 8/2002 | Feibelman | ............... | 340/572.8 |
| 6,629,382 B2 * | 10/2003 | Irrgang et al. | ................. | 43/22 |
| 6,694,666 B2 * | 2/2004 | Iwabuchi | ........................ | 43/25 |
| 6,774,794 B2 * | 8/2004 | Zimmerman et al. | .... | 340/572.8 |
| 7,129,841 B2 * | 10/2006 | Feibelman | ............... | 340/568.1 |
| 2005/0128089 A1 * | 6/2005 | Feibelman | ............... | 340/572.9 |
| 2006/0021394 A1 * | 2/2006 | Belden, Jr. | ................... | 70/57.1 |
| 2006/0174667 A1 * | 8/2006 | Garner | ........................ | 70/57.1 |

* cited by examiner

*Primary Examiner*—Lloyd A. Gall
(74) *Attorney, Agent, or Firm*—Hofmann & Baron, LLP

(57) ABSTRACT

An electronic marker device affixes a fishing rod to a fishing reel. The device includes a marker housing having a base and a cover to enclose the moveable socket of a fishing rod thereby preventing removal of the fishing reel from the fishing rod. The marker housing also supports an electronic marker so as to deter unauthorized removal of the rod and reel combination. The marker may be preferably an electronic article surveillance (EAS) marker.

12 Claims, 6 Drawing Sheets

ROD AND REEL SUPPORT WITH ELECTRONIC MARKER DEVICE

FIELD OF THE INVENTION

The present invention relates generally to a securement device for securing a fishing rod to a fishing reel for combined sale in a retail environment. More particularly, the present invention relates to a securement device for securing a rod to a reel and for supporting an electronic tag such as an article surveillance marker.

BACKGROUND OF THE INVENTION

It is commonplace for fishing equipment, such as rods and reels, to be sold as a combined product, i.e., a particular fishing rod will be associated with a particular fishing reel and sold as a mated pair of components. The components of each pair are usually selected by the manufacturer so as to be compatible from a standpoint of quality and price. In this manner, a consumer will purchase a combined rod and reel having similar quality and use characteristics.

The manufacturer of the components would typically assemble the rod to the reel using simple securement techniques, such as plastic clips, cable ties, shrink wrap and the like. Once the combined product reaches the retail shelves, a consumer may seek to "swap out" one component of one pair with a component of a different pair. Such "swapping out" of components would allow a consumer to obtain a new combination at a price of the original combination. This results in the loss of revenue to the retailer.

One technique to assure that the combination supplied by the manufacturer remains intact until after purchase by the consumer is shown in U.S. Pat. No. 6,151,826. This patent provides a lockable reel seat system which secures the reel to the rod. However, this patent requires that the rod be specifically manufactured to accommodate the reel seat lock. Thus, the technique shown in this patent cannot be universally used with existing rod and reel combinations.

In addition, theft deterrence with regard to the individual components or the mated combination is also a significant consideration. While conventional theft deterrent markers may be used on one or more of the components of the combination, it requires separate application in addition to the application of securement structures to secure the rod to the reel.

It is desirable to provide a securement device which can attach to a conventional rod and reel combination to secure the rod to the reel and which would include an electronic tag such as an article surveillance marker so that an indication is provided that the components have been swapped out and which also provide theft deterrence.

SUMMARY OF THE INVENTION

The present invention provides an electronic tag or marker device for affixing to a rod and reel assembly. The assembly includes a fishing rod having an elongate mounting foot for attachment between a fixed and movable socket on a fishing rod. The device includes a marker housing having a base and a cover attachable to the base so as to overlie and enclose the movable socket with the foot attached thereto. The marker housing prevents access to the movable socket without destructively detaching the cover from the base. An electronic tag is supported within the housing.

DETAILED DESCRIPTION OF THE PREFERRED EMBODIMENTS

The present invention provides a combination securement device for securing a fishing rod to a fishing reel and a device for supporting an electronic tag such as an article surveillance marker.

Figure 1:
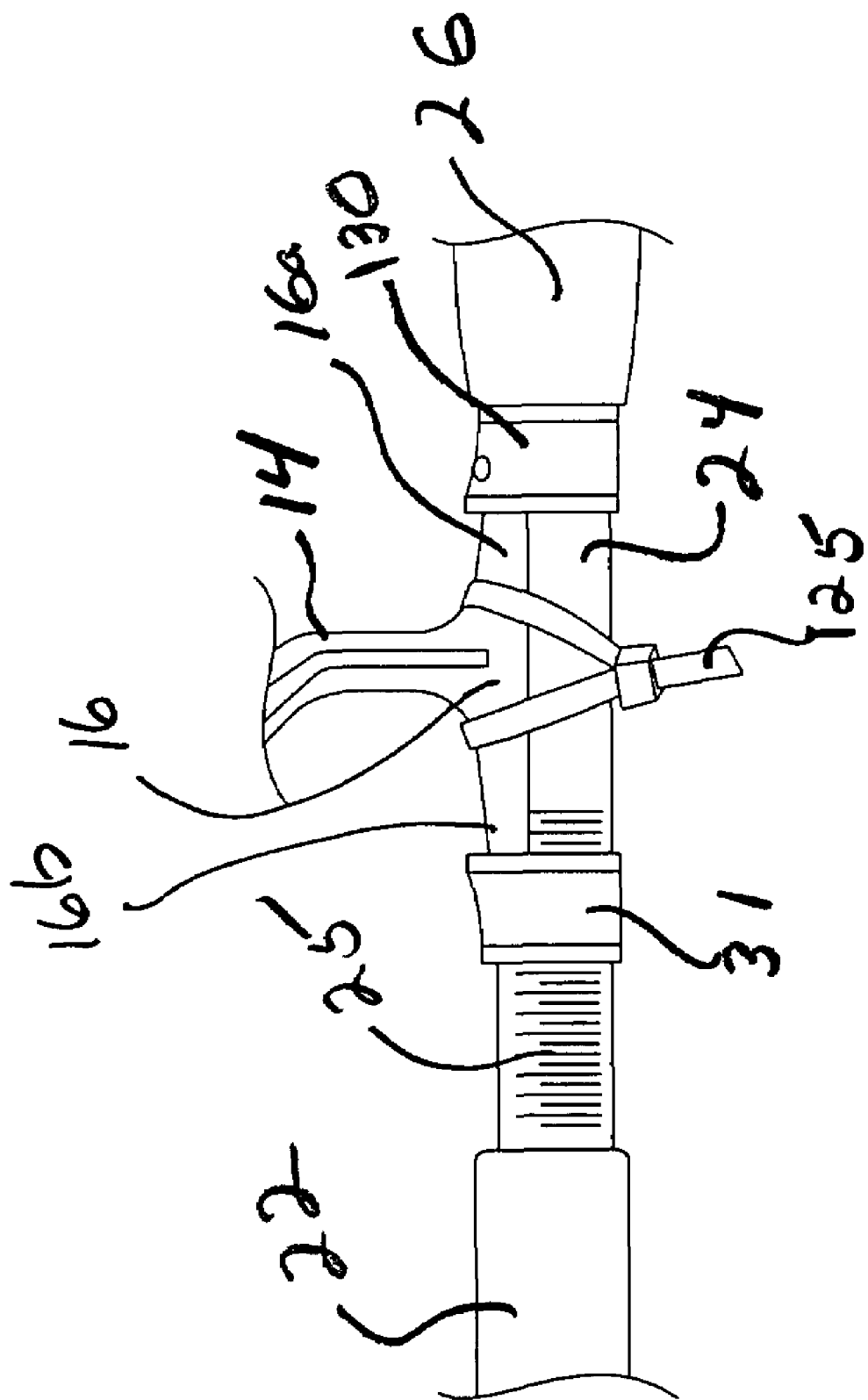
FIG. 1 shows a portion of a rod and reel combination which may be employed in accordance with the present invention.
Figure 2:
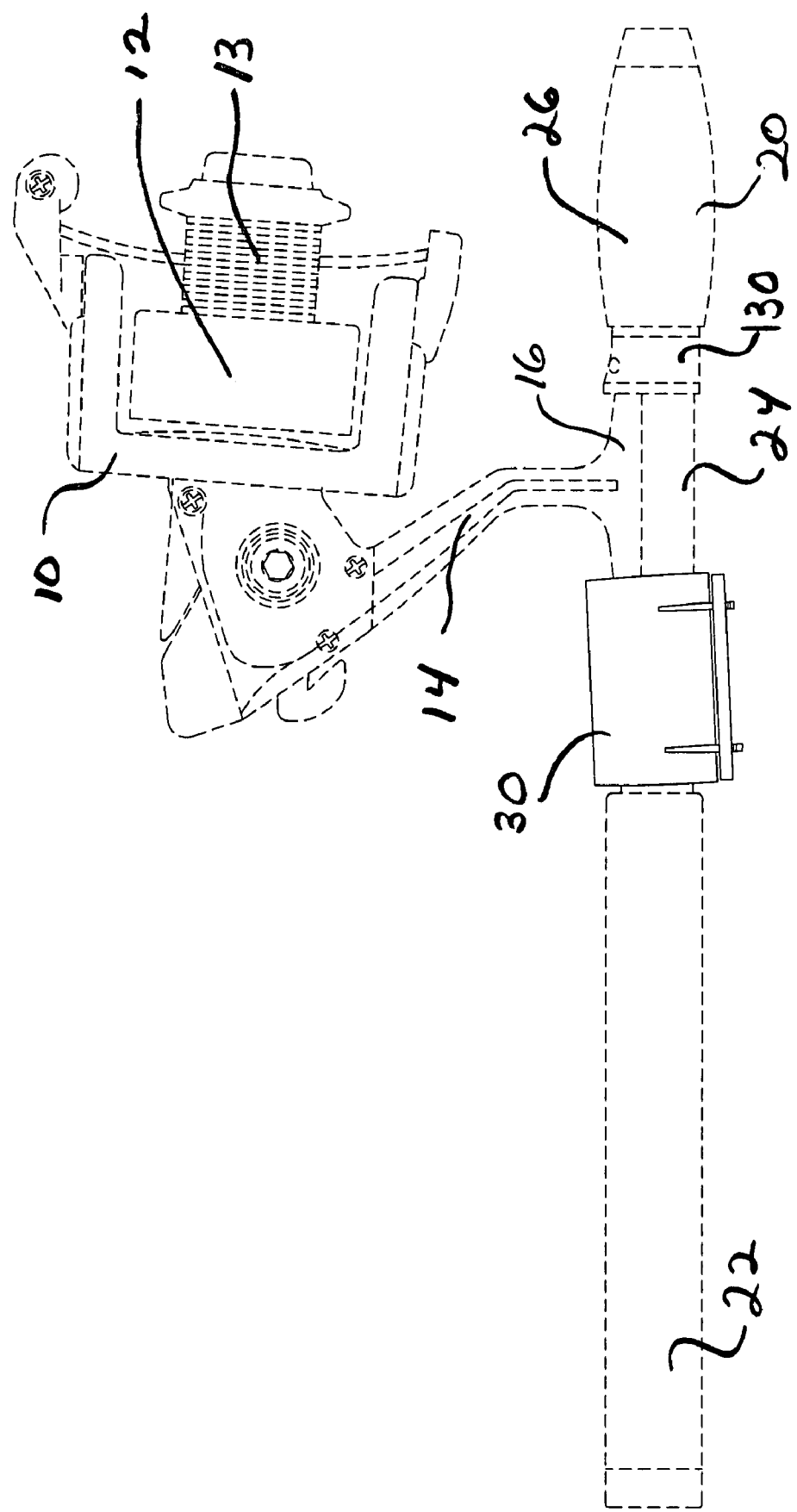
FIG. 2 shows the electronic marker device affixed to the combination rod and reel which is shown in phantom.
Figure 3:
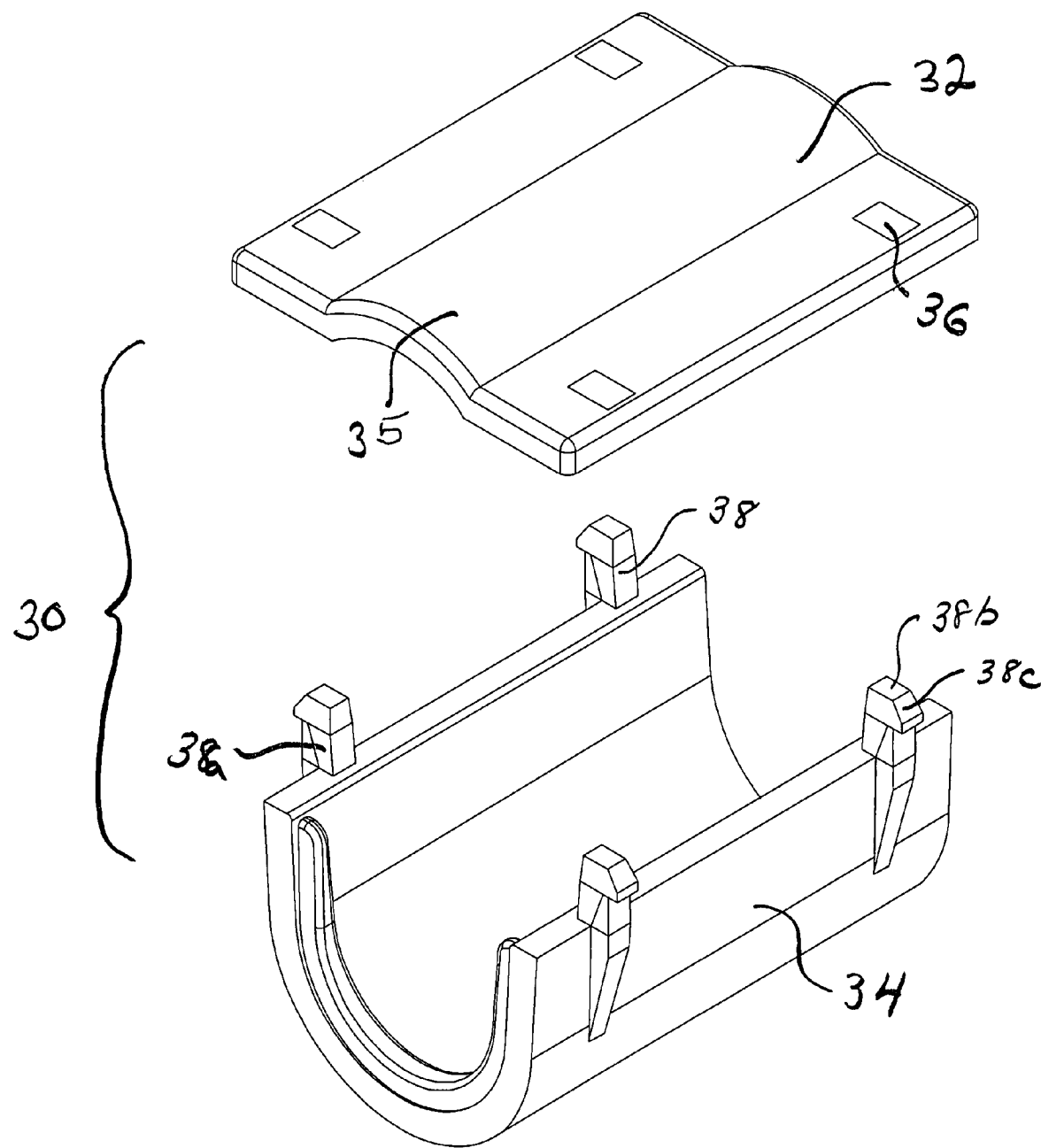
FIG. 3 shows an exploded perspective view of the marker device housing of FIG. 2.

Referring to FIGS. 1 and 2, a fishing reel 10 is shown attached to a fishing rod 20 in position for sale as a combined unit. The fishing reel 10 and rod 20 are of conventional construction.

Specifically, the reel 10 includes a reel body 12 which supports fishing line 13. A depending arm 14 extends from the reel body 12 and an elongate transverse foot 16 extends perpendicular to the arm 14. As will be described in further detail hereinbelow, the foot 16 is used to mount the fishing reel 10 to the fishing rod 20.

The rod 20 is also of conventional construction and is an elongate member having enlarged rear handle 22, a flexible central shaft 24 and an enlarged forward handle 26. The shaft 24 supports a pair of mounting sockets 130 and 31 thereon. Mounting socket 130 is a stationary socket supported adjacent the forward handle 26 while socket 31 is a moveable socket movably supported on a threaded portion 25 of shaft 24 for longitudinal movement therealong. In conventional fashion the moveable socket 31 may be moved rearwardly towards the rear handle 22 so as to allow placement of the mounting foot 16 of reel 10 onto the central portion of shaft 24. The forward tip 16a of mounting foot 16 may be placed within stationary socket 130; and the moveable socket 31 may be moved along shaft 24 so that it covers the rear tip 16b of mounting foot 16. In this position, the reel is securely attached to the rod. However, as may be appreciated, by movement of the moveable socket 31 toward the rear handle 22, the reel can be easily removed from the rod. In retail situations where the rod and reel are sold as a combined product, such removal of the reel from the rod may allow consumers to swap out the components of one combination with the components of another thus allowing the consumer to obtain a new combination at the price of the original combination. Locking devices such as cable ties 125 have been used to secure the reel 10 to the rod 20, but such devices can be easily removed.

The present invention provides a device which may be secured to the rod and reel combination to prevent the undetected swapping out of components.

Figure 6:
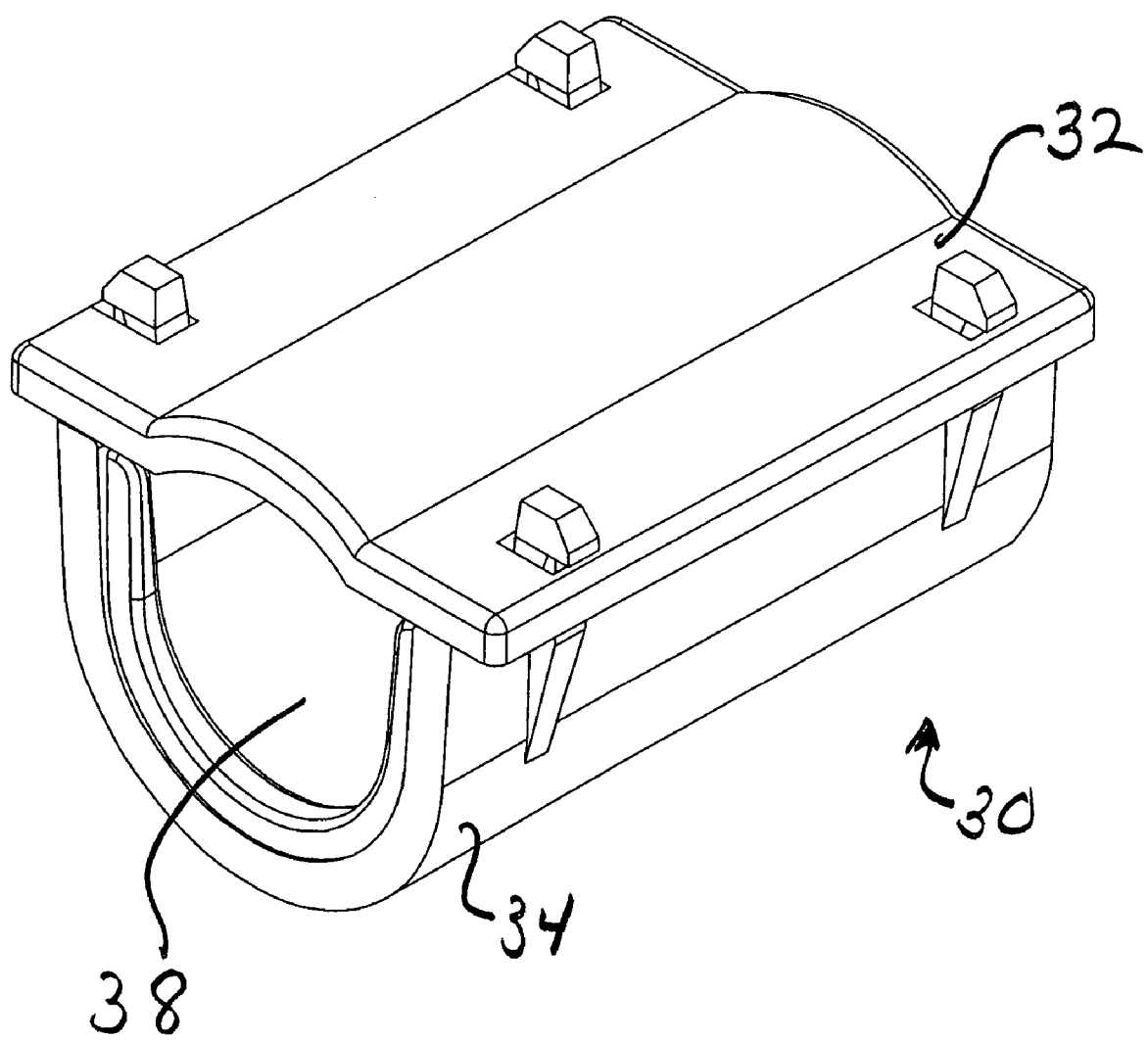
FIG. 6 is a perspective showing of the marker housing in the assembled condition.

Referring more specifically to FIG. 2, the reel 10 and rod 20 assembled as described above is shown. A securement device 30 of the present invention is shown. Securement device 30, which is more frilly shown in FIGS. 3-6, is a two-part molded plastic housing having a base 32 and cover 34. Base 32 is generally planar having a central curved location 35 which may be accommodated around the cylindrical shaft 24 of rod 20. The cover 34 is generally U-shaped and is designed for interlocking engagement with base 32. The assembled housing which is shown in FIG. 6 provides a generally cylindrical passage 38 therethrough which, as shown in FIG. 2, accommodates the shaft 24 of rod 20.

Referring again to FIG. 2, when placed about the assembled rod and reel combination, the device housing encloses the moveable socket 31 (FIG. 1) preventing access thereto. Without access to the moveable socket 31, the reel 10 cannot be removed from the rod 20.

The base 32 is secured to the cover 34 in such a manner that it cannot be non-destructibly disassembled. In that regard, referring again to FIGS. 3-6, the base 32 includes a plurality of apertures 36 which are aligned for receiving fingers 38 which extend from cover 34. The fingers 38 have an elongate shaft portion 38a and a transverse lip 38b extending outwardly therefrom. The lip 38b includes an upper ramped surface 38c which allows the fingers 38 to be inserted into the apertures 36 in an insertion direction. However, the configuration of the fingers 38 are such that the fingers cannot be withdrawn from the apertures so as to easily remove the base from the cover.

Figure 4:
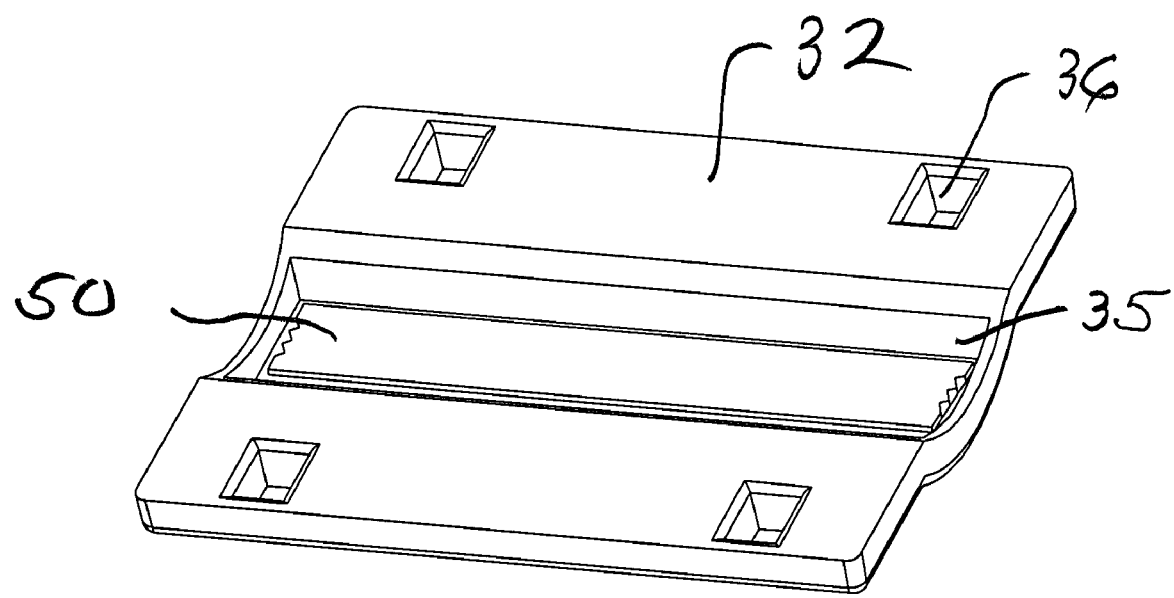
FIG. 4 is a perspective showing of the base of the marker housing of FIG. 2.
Figure 5:
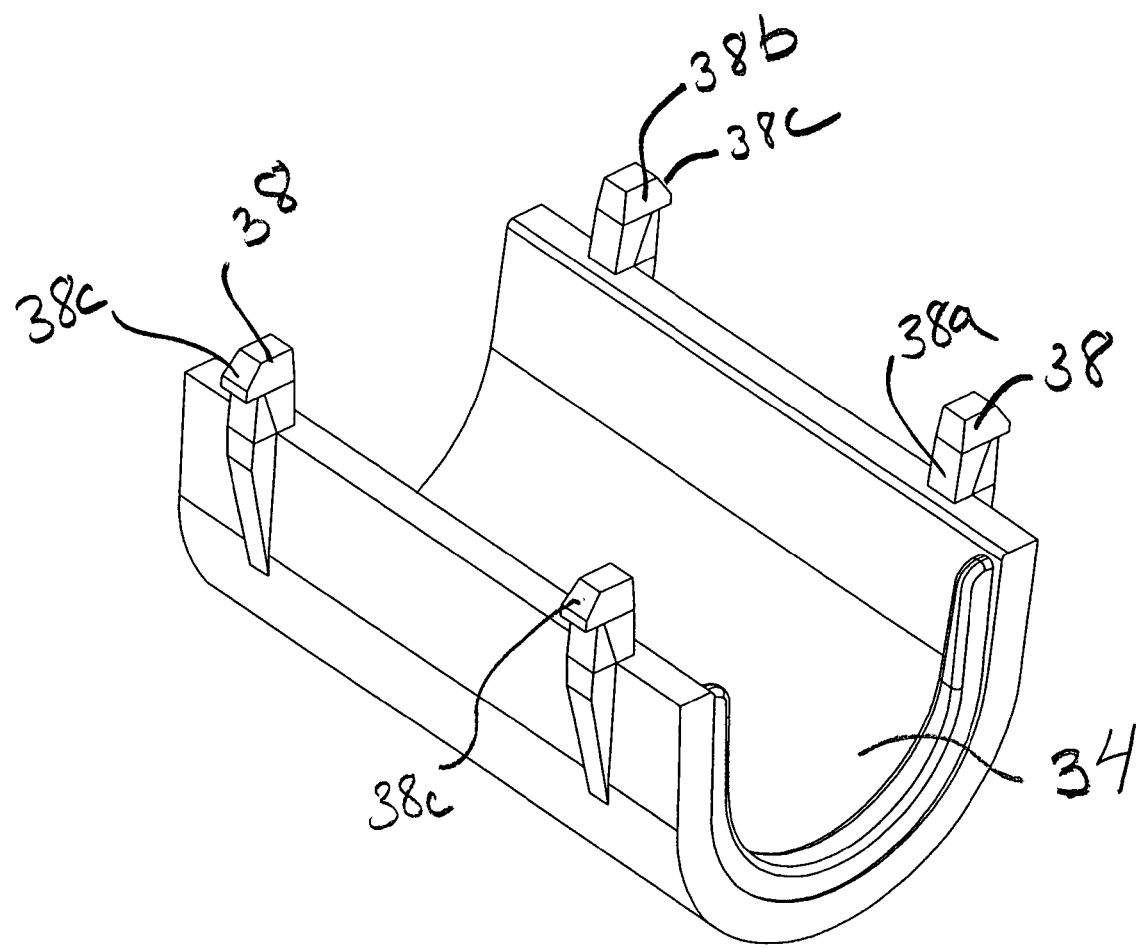
FIG. 5 is a perspective showing of the cover of the marker housing of FIG. 2.

A further feature of the present invention is more fully shown in FIG. 4. In addition to securely retaining the reel 10 to the rod 20, the securement device 30 housing also supports an electronic tag or marker. The marker 50 may be any type of electronic marker such as a radio frequency identification (RFID) tag or an electronic article surveillance (EAS) marker. In the preferred embodiment, shown herein in FIG. 4, marker 50 is a conventional electronic article surveillance marker which may be used to electronically detect removal of the particular item to which it is applied from a retail outlet. Such an electronic article surveillance maker may be applied to the securement device housing so as to provide non-detectable article surveillance to the combined rod and reel. In the present illustrative embodiment, the marker 50 may be applied to the base 32 as shown in FIG. 4 by adhesively securing the marker within the arcuate portion 35 of the base.

Having described the structural elements of the present invention, its use in securing a reel to a rod may now be described. Referring again to FIGS. 1 and 2, the reel 10 is secured to rod 20 as above described using the stationary and moveable sockets 30 and 31 to secure the foot 16 to the shaft 24. Thereafter, the marker device housing 30 is attached to the shaft 24 about the moveable socket 31. The electronic article surveillance marker 50 is resident within the base 32 of device 30. The base 32 is snap fitted onto the cover 34 with the fingers being insertably positioned within the apertures so as to non-removably attach the cover 34 to the base 32 about the shaft 24. Moreover, access to the moveable socket is prevented as the device 30 cannot be slid off of socket 31. The arm 14 of reel 10 prevents forward movement while the rear handle 22 prevents rearward movement. With the reel 10 secured to the rod 20 in such a manner, the present invention provides both a device which prevents nondetectable swapping out of components of the rod and reel assembly, and also provides electronic article surveillance for the combination.

Various changes to the foregoing described and shown structures will now be evident to those skilled in the art. Accordingly, the particularly disclosed scope of the invention is set forth in the following claims.

What is claimed is:

1. An electronic marker device for affixing to a fishing rod and reel assembly, said device comprising:
a marker housing having a base and a cover, said base having two planar wings attached to either side of a central curved portion, said cover having a U-shaped geometry, said central curved portion and U-shaped cover adapted to receive a fishing rod therein, said housing is sized to overlie and enclose a movable socket of said fishing rod, each side of said cover and each of said two planar wings include irreversibly cooperative interlocking structures to irreversibly attach each side of said cover to each side of said base and prevent access to said movable socket without destructively detaching said cover from said base; and
an electronic marker supported within said housing.

2. A marker device of claim 1 wherein said base is generally planar and said cover is arcurate, said housing thereby defining a passage theretbrough for accommodating said movable socket therein.

3. A marker device of claim 2 wherein said housing being slidably captive on said rod between an arm of said reel and a handle of said rod.

4. A marker device of claim 1 wherein said base and said cover include cooperative interlocking structure to secure said cover to said base preventing non-destructible detachment.

5. A marker device of claim 4 wherein said cooperative interlocking structure includes said base having at least one aperture therethrough and said cover having an extending finger for non-removable insertion into said aperture.

6. A marker device of claim 5 wherein said finger includes a ramped surface for facilitating insertion into said aperture in an insertion direction.

7. A marker device of claim 1 wherein said housing is formed from molded plastic.

8. A marker device of claim 1 wherein said electronic marker is supported by said base.

9. A marker device of claim 8 wherein said electronic marker is adhesively secured to said base.

10. A marker device of claim 2 wherein said cover and said base define a generally cylindrical passage.

11. A marker device of claim 1 wherein said marker is an electronic article surveillance (EAS) marker.

12. A fishing rod and reel electronic marker assembly, comprising:
a fishing rod having a stationary socket and a movable socket;
a fishing reel having an elongated mounting foot attached to said fishing rod;
a marker housing having a base and a cover, said base having two planar wings attached to either side of a central curved portion, said cover having a U-shaped geometry, said central curved portion and U-shaped cover adapted to receive said fishing rod therein, said cover is irreversibly attachable to said base, said housing irreversibly attached to said movable socket of said fishing rod; said marker housing preventing access to said movable socket without destructively detaching said cover from said base; and
an electronic marker supported within said housing.

* * * * *

UNITED STATES PATENT AND TRADEMARK OFFICE
CERTIFICATE OF CORRECTION

PATENT NO. : 7,363,783 B2
APPLICATION NO. : 11/236417
DATED : April 29, 2008
INVENTOR(S) : Kolton et al.

It is certified that error appears in the above-identified patent and that said Letters Patent is hereby corrected as shown below:

At column 2, line 66, the printed patent incorrectly reads "...is more frilly shown in..."; the patent should read --is more fully shown in--.

At column 3, lines 35-36, the printed patent incorrectly reads "...surveillance maker may be applied..."; the patent should read --surveillance marker may be applied--.

Signed and Sealed this

Twenty-ninth Day of July, 2008

JON W. DUDAS
*Director of the United States Patent and Trademark Office*